(12) United States Patent
Soroushnejad et al.

(10) Patent No.: US 8,280,024 B1
(45) Date of Patent: Oct. 2, 2012

(54) SYSTEM, METHOD, AND COMPUTER PROGRAM PRODUCT FOR SENDING A REQUEST TO A NETWORK FOR ROUTING A CALL

(75) Inventors: Mohsen Soroushnejad, San Jose, CA (US); Venkatesh Venkataramanan, Campbell, CA (US); Suresh M. Srinivasa Rao, Sunnyvale, CA (US); John E. Franklin, Cupertino, CA (US)

(73) Assignee: BroadSoft, Inc., Gaithersburg, MD (US)

( * ) Notice: Subject to any disclaimer, the term of this patent is extended or adjusted under 35 U.S.C. 154(b) by 1117 days.

(21) Appl. No.: 11/833,114

(22) Filed: Aug. 2, 2007

(51) Int. Cl.
*H04M 3/42* (2006.01)
*H04W 4/00* (2009.01)

(52) U.S. Cl. ......... 379/207.02; 379/201.02; 379/201.05; 455/432.3

(58) Field of Classification Search .............. 379/220.01, 379/114.1, 207.02, 201.01, 201.02, 201.05, 379/201.07, 201.08; 709/204; 455/11.1, 455/414.1, 432.3, 518
See application file for complete search history.

(56) References Cited

U.S. PATENT DOCUMENTS

| | | | | |
|---|---|---|---|---|
| 6,252,952 B1 * | 6/2001 | Kung et al. | ................. | 379/114.1 |
| 6,751,483 B1 | 6/2004 | Oh | ................................. | 455/566 |
| 6,996,217 B2 | 2/2006 | Goldman | ................. | 379/142.01 |
| 7,801,953 B1 * | 9/2010 | Denman et al. | ................ | 709/204 |
| 2003/0147519 A1 | 8/2003 | Jain et al. | .................. | 379/211.02 |
| 2003/0224722 A1 * | 12/2003 | Martin et al. | ................. | 455/11.1 |
| 2004/0120494 A1 | 6/2004 | Jiang et al. | ................ | 379/210.01 |
| 2004/0122810 A1 | 6/2004 | Mayer | ................................ | 707/3 |
| 2005/0175172 A1 | 8/2005 | Janssen | .......................... | 379/440 |
| 2006/0043164 A1 | 3/2006 | Dowling et al. | ............... | 235/375 |
| 2006/0083220 A1 | 4/2006 | Mekala et al. | ................. | 370/352 |
| 2006/0094466 A1 | 5/2006 | Tran | .............................. | 455/558 |
| 2006/0104428 A1 | 5/2006 | Jin | ........................... | 379/142.01 |
| 2006/0291639 A1 | 12/2006 | Radziewicz et al. | ...... | 379/211.01 |

FOREIGN PATENT DOCUMENTS

WO     WO 00/05905     2/2000

OTHER PUBLICATIONS

"Personal Ring Back Tones," Cantata Technology, Inc., Needham, MA, 2006.
Non-Final Official Action for U.S. Appl. No. 11/833,091 (Oct. 4, 2011).

* cited by examiner

*Primary Examiner* — Thjuan K Addy
(74) *Attorney, Agent, or Firm* — Jenkins, Wilson, Taylor & Hunt, P.A.

(57) ABSTRACT

A system, method, and computer program product are provided for sending a request to a network for routing a call. In use, a call is initiated from a first party to a second party. Further, it is determined, whether the first party and the second party are members of a group. Still yet, a request is sent to a network for routing the call. The request includes an indication that origination processing and/or termination processing has already been performed, based on the determination.

20 Claims, 7 Drawing Sheets

SYSTEM, METHOD, AND COMPUTER PROGRAM PRODUCT FOR SENDING A REQUEST TO A NETWORK FOR ROUTING A CALL

FIELD OF THE INVENTION

The present invention relates to telecommunication systems, and more particularly to call processing utilizing telecommunication systems.

BACKGROUND

Telecommunication systems customarily utilize telephony applications for processing calls initiated therein. However, in use, such applications traditionally process originating calls associated with an initiator of a call separate from terminating calls associated with a receiver of the call. As a result, various limitations are associated with such separate call processing. Just by way of example, processing the originating calls separate from the terminating calls may result in redundant processing of the calls.

Figure 1:
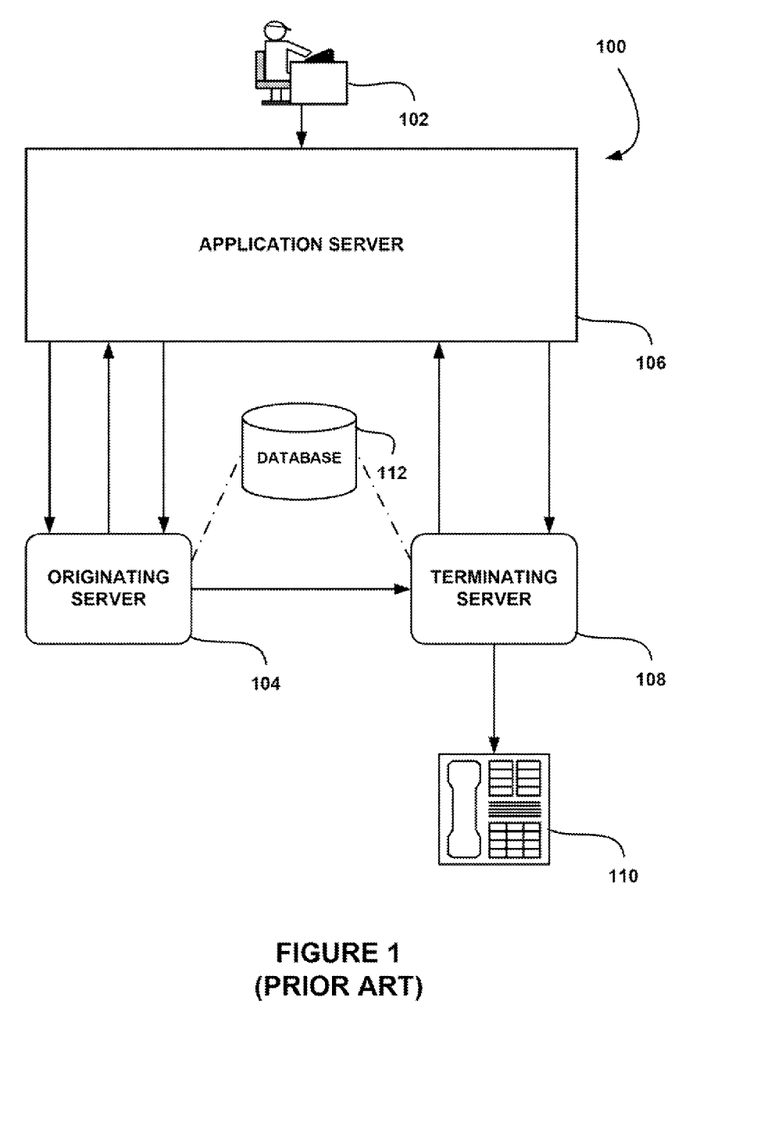
FIG. 1 illustrates a telecommunication system, in accordance with the prior art.

As shown in the prior art telecommunication system 100 of FIG. 1, a first party 102 is coupled with an application server 106. In response to receipt of a request from the first party 102 to initiate a call to a second party 110, the application server 106 routes an originating call request to an originating server 104 for call request processing. In response, the originating server 104 receives data associated with the first party 102 from a database 112, and routes the originating call request with such data back to the application server 106. In turn, the application server 106 further processes the originating call request with the data and sends the call request back to originating server 104.

In addition, the originating server 104 forwards the call to a terminating server 108 based on the processed originating call request. In response to receipt of the call, the terminating server 108 receives data associated with the second party 110 from the database 112, and routes a terminating call request with such data to the application server 106. Additionally, the application server 106 processes the terminating call request utilizing the data associated with the second party 110, such that the call may be routed to the second party 110 based on such processing.

Thus, as shown, the application server 106 performs redundant processing on the call request. For example, the application server 106 performs redundant processing for the second processing of the originating call request, and, in addition, may perform redundant processing during processing of the terminating call request. There is thus a need for addressing these and/or other issues associated with the prior art.

SUMMARY

A system, method, and computer program product are provided for sending a request to a network for routing a call, in use, a call is initiated from a first party to a second party. Further, it is determined whether the first party and the second party are members of a group. Still yet, a request is sent to a network for routing the call. The request includes an indication that origination processing and/or termination processing has already been performed, based on the determination.

DETAILED DESCRIPTION

Figure 2:
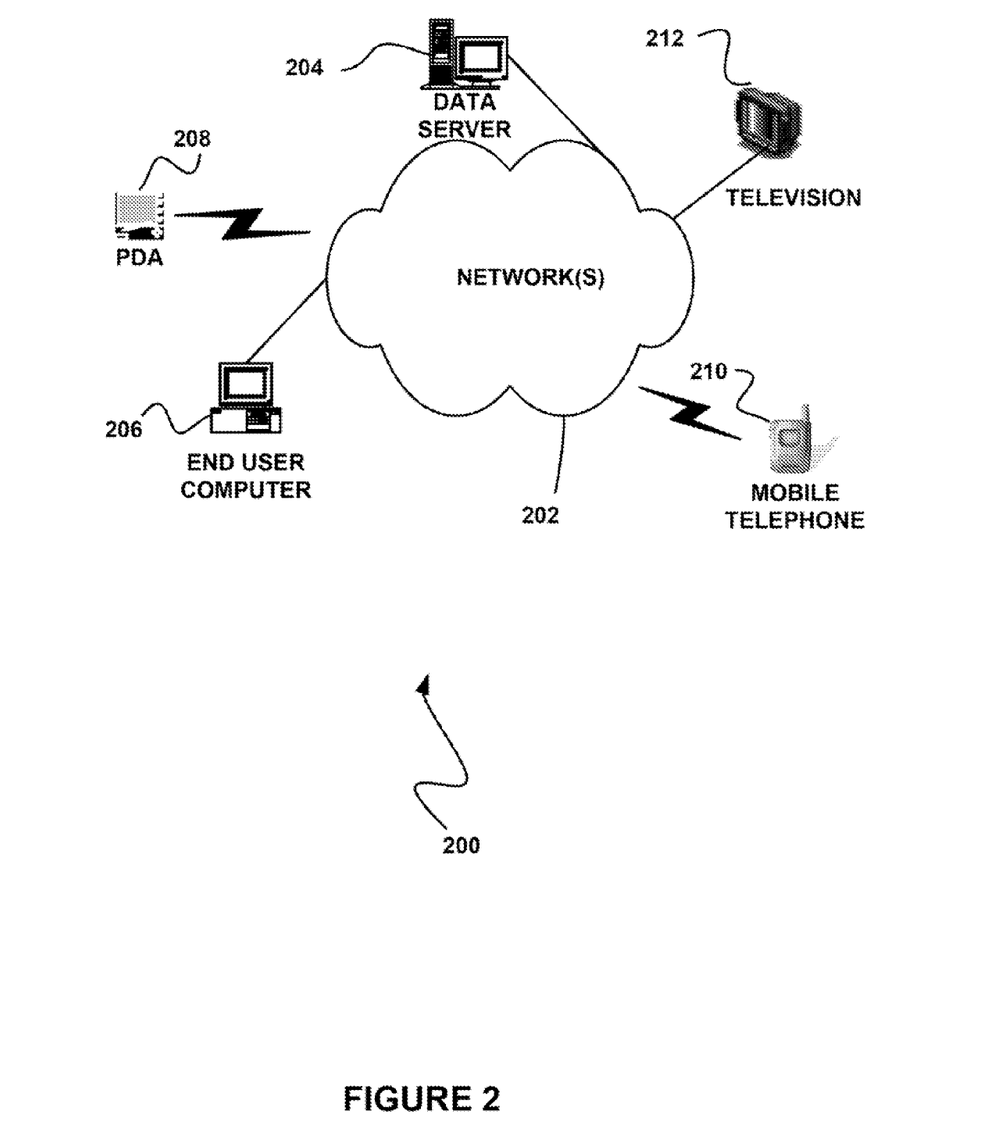
FIG. 2 illustrates a network architecture, in accordance with one embodiment.

FIG. 2 illustrates a network architecture 200, in accordance with one embodiment. As shown, at least one network 202 is provided. In the context of the present network architecture 200, the network 202 may take any form including, but not limited to a telecommunications network, a local area network (LAN), a wireless network, a wide area network (WAN) such as the Internet peer-to-peer network, cable network, etc. While only one network is shown, it should be understood that two or more similar or different networks 202 may be provided.

Coupled to the network 202 is a plurality of devices. For example, a server computer 204 and an end user computer 206 may be coupled to the network 202 for communication purposes. Such end user computer 206 may include a desktop computer, lap-top computer, and/or any other type of logic. Still yet, various other devices may be coupled to the network 202 including a personal digital assistant (PDA) device 208, a mobile phone device 210, a television 212, etc.

Figure 3:
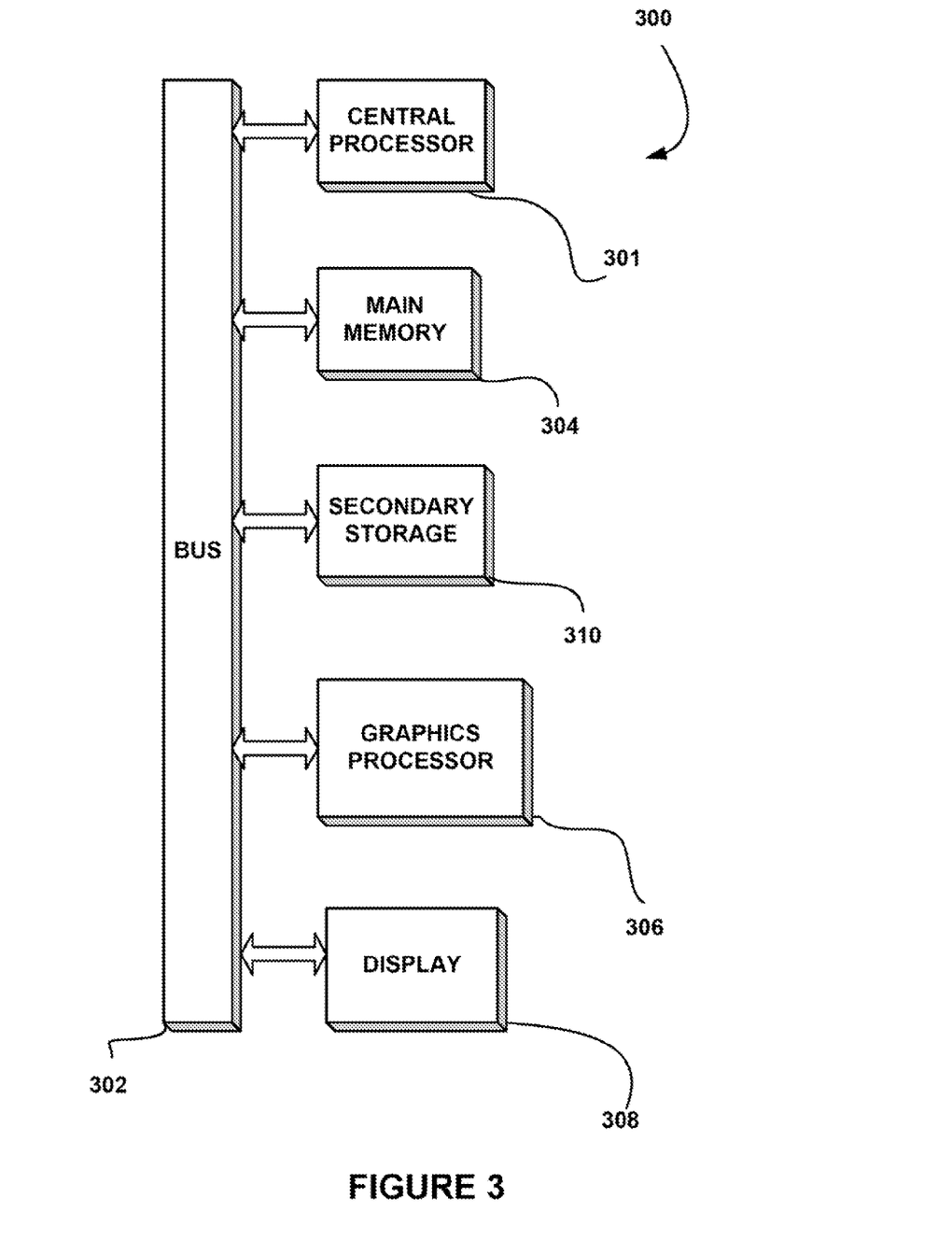
FIG. 3 illustrates an exemplary system, in accordance with another embodiment.

FIG. 3 illustrates an exemplary system 300, in accordance with another embodiment. As an option, the system 300 may be implemented in the context of any of the devices of the network architecture 200 of FIG. 2. Of course, the system 300 may be implemented in any desired environment.

As shown, a system 300 is provided including at least one central processor 301 which is connected to a communication bus 302. The system 300 also includes main memory 304 [e.g. random access memory (RAM), etc]. Strictly as an option, the system 300 may also include a graphics processor 306 and a display 308.

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions (to be set forth below, for example). Memory 304, storage 310 and/or any other storage are possible examples of computer-readable media.

Figure 4:
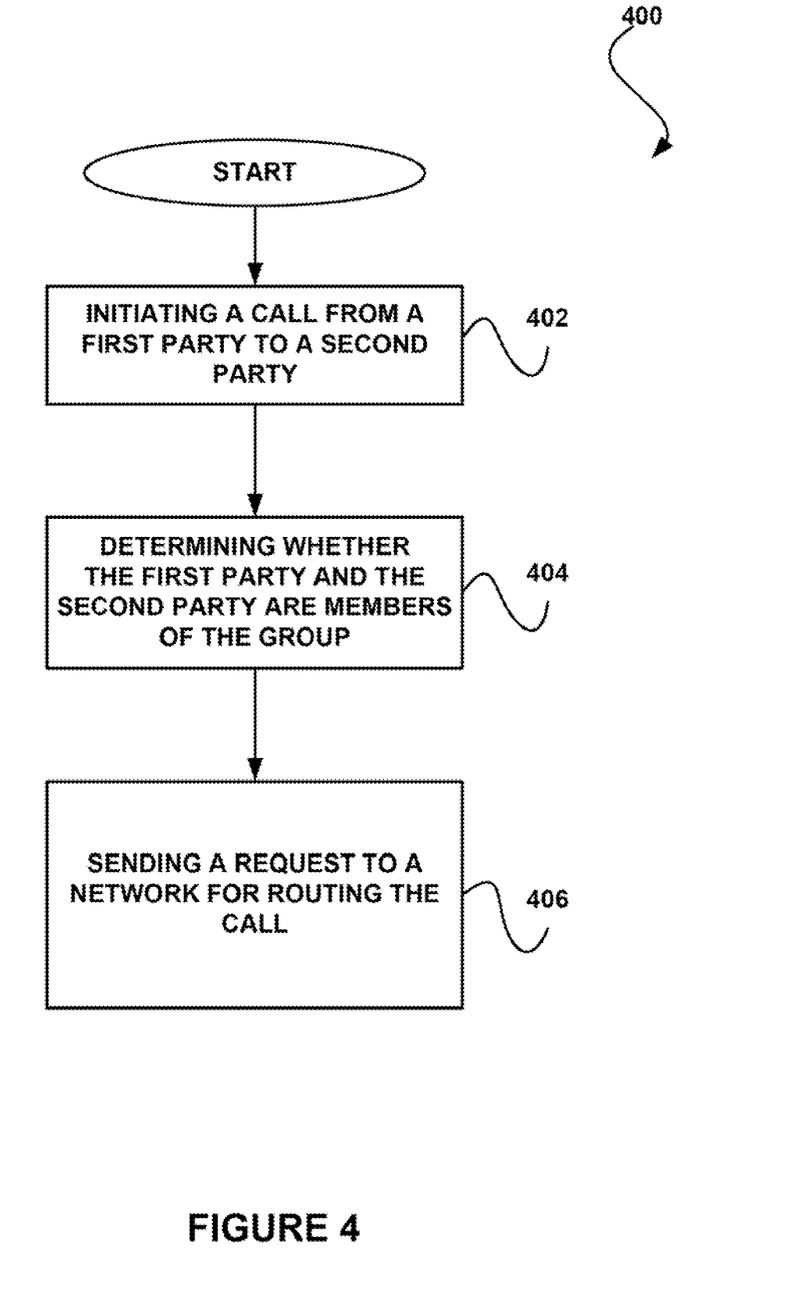
FIG. 4 illustrates a method for sending a request to a network for routing a call, in accordance with yet another embodiment.

FIG. 4 illustrates a method 400 for sending a request to a network for routing a call, in accordance with one embodiment. As an option, the method 400 may be carried out in the context of the details of FIGS. 2 and/or 3. Of course, however, the method 400 may be carried out in any desired environment. Further, the aforementioned definitions may equally apply to the description below.

As shown in operation 402, a call is initiated from a first party to a second party. In one embodiment, the first party may be as calling party, and the second party may be a called party. For example, the first party may be an initiator of a call, and the second party may be a receiver of such call. In various embodiments, the call may include a video call, an audio call, a voice call, a message, and/or any other communication session capable of being initiated from a first party to a second party.

In addition, the call may optionally be initiated over a network (e.g. such as any of the networks described above with respect to FIG. 2, etc.). To this end, the first party and the second party may be located on the network. Further, the call may be initiated from the first party to the second party by any manner utilizing software, hardware, etc. Just by way of example, software associated with the first party may initiate a call to hardware associated with the second party, etc.

In the context of software via which the call may be initiated, such software may include a software driver, an application, an operating system, etc. Optionally, such application may include a network based application such as a voice application, a network browser, a web browser, an electronic mail (email) application, and/or any other application capable of initiating a call over a network.

In another embodiment, the software may include a web portal. For example, the web portal may include an application capable of accessing, various information located on the network. To this end, the call may be issued by the first party via the web portal.

Still yet, in the context of hardware via which the call may be initiated, such hardware may include any of the devices described above with respect to FIGS. 2 and/or 3 (e.g. such as a PDA, an end user computer, a mobile telephone, a television, etc.). In this way, the first party and the second party may be associated with different devices, such that the call may be initiated from one device to another device.

In one embodiment, the call may be initiated manually. For example, the call may be initiated by a user utilizing the software, hardware, etc. In another embodiment, the call may be initiated automatically. For example, the call may be initiated without user interaction (e.g. based on a schedule, a response, etc.) utilizing the software, hardware, etc. Of course, it should be noted that the call may be initiated from the first party to the second party in any desired manner.

Further, in operation 404, it is determined whether the first party and the second party are members of a group. In the context of the present description, the group may include any predefined collection, set, etc. of parties. To this end, various parties may be predetermined to be members of a group.

In one embodiment, determining whether the first party and the second party are members of a group may include determining whether such parties are members of a same group. Furthermore, the determination may be based on information associated with the first party and/or the second party. For example, such information may indicate groups associated with each of such parties.

In one embodiment, such information may include an identifier associated the first party. For example, such identifier may include a source identifier (e.g. location, device identifier, etc.) of the first party. In another embodiment, such information may include an identifier associated with the second party. For example, such identifier may include a destination identifier (e.g. location, device identifier, etc.) of the second party. To this end, identifiers of the first party and/or second party may be utilized for identifying groups to which such parties are members.

Still yet, in another embodiment, the determination may be based on a query of configuration information. Such configuration information may thus indicate a group of the first party and the second party. For example, the configuration information may be configured by an administrator, an application, etc.

Just by way of example, the identifier of the first party and the identifier of the second party, as described above, may be utilized for querying such configuration information. To this end, the configuration information may optionally be stored in at least one database. Accordingly, configuration information for a plurality of parties may be stored in the database in association with identifiers thereof.

Moreover, in response to identifying a group associated with the first party and the second party, such groups may be compared to determine whether there is a match. In this way, it may be determined whether the first patty and the second party are members of the group. Of course, it should be noted that it may be determined whether the first party and the second party are members of a group in any desired manner.

Additionally, in one embodiment, the group may be a closed user group. Such closed user group may include a predefined group of parties for which predetermined services are provided. In various embodiments, the services may be predetermined based on a default set of services, administrator defined services, user defined services, etc. For example, the services may include click-to-call and/or click-to-conference services capable of allowing a call or a conference call, respectively, to be initiated based on a selection of options located on a web page.

In other examples, the services may include blind transfer, find me forwarding features, other call forwarding features, private extension dialing, distinctive ringing (e.g. for incoming calls within or outside the group), an intercom feature, and/or any other services capable of being associated with a call. Optionally, such services may be provided on behalf of a hosted (e.g. subscription, etc.) service. To this end, various groups may be associated with different sets of services.

In addition, if it is determined that the first party and the second party are members of the group, a request is sent to the network for routing the call. See operation 406. In the context of the present description, the request includes an indication that origination processing and/or termination processing has already been performed based on the determination. Optionally, the request may include a flag for indicating that the origination processing or terminating processing has already been performed. Of course, however, any desired type of indicator may be utilized for providing such indication.

In one embodiment, the originating processing may include any processing associated with the initiation of the call with respect to the first party. For example, the origination processing may include determining whether the first party and the second party are members of the group, applying services to the call for the first party, etc. In another embodiment, the terminating processing may optionally include any processing associated with processing the call for the second party. For example, the termination processing may include applying services to the call for the second party, etc.

Furthermore, in one embodiment, the request may indicate that the only the origination processing has already been performed if it is determined that the first party and the second party are not members of the group. In this way, termination processing may be performed in response to the indication associated with the request. In another embodiment, the request may indicate that the origination processing and the termination processing have already been performed if it is determined that the first party and the second party are members of the group. For example, such indication may result from call processing (e.g. for setting up services associated with the call, etc.) being performed for both the first party and the second party based on such parties being members of the group. To this end, termination processing may be prevented from being repeated if the request indicates that such termination processing has already been performed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
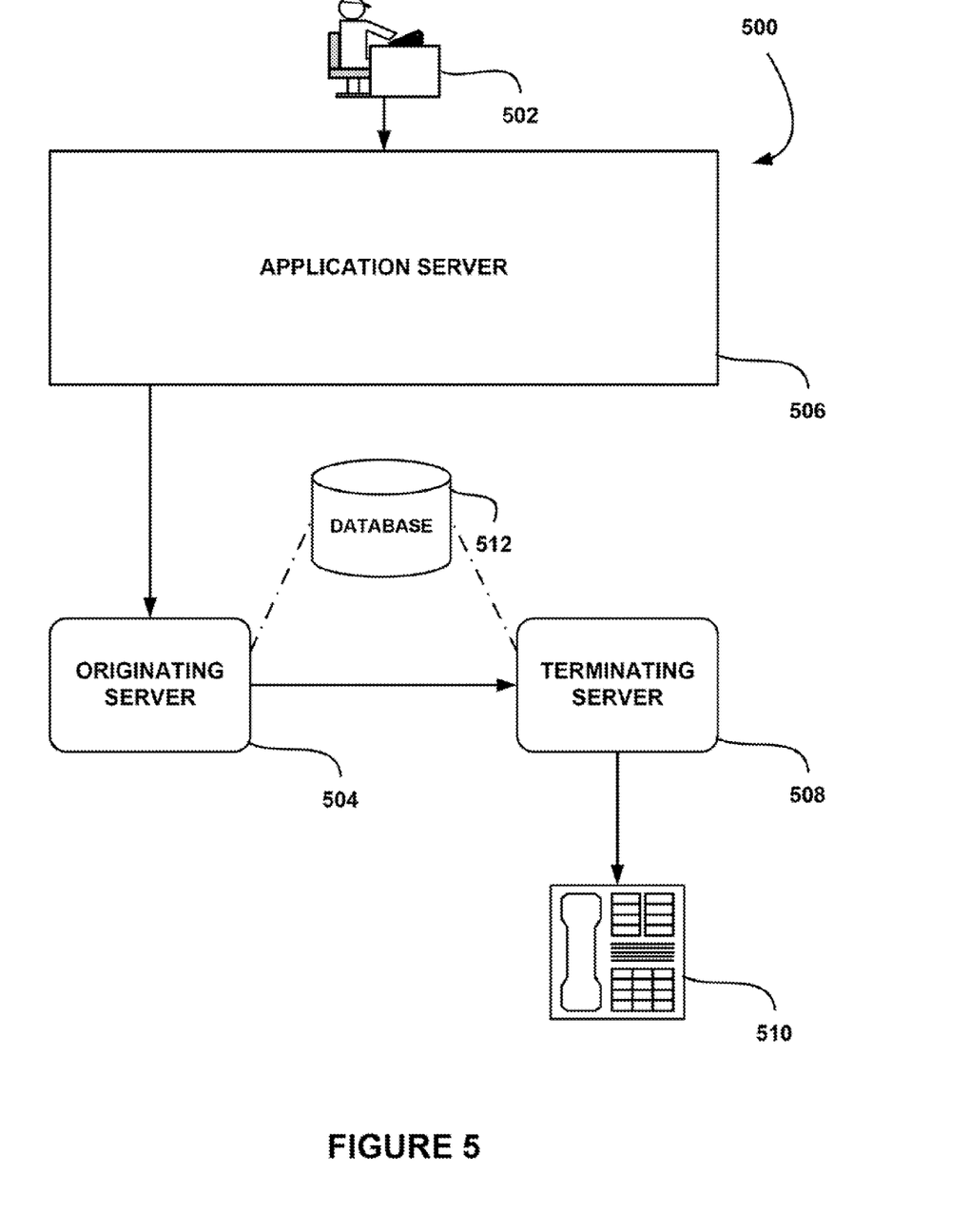
FIG. 5 illustrates a system for sending a request to a network for routing a call, in accordance with still yet another embodiment.

FIG. 5 illustrates a system 500 for sending a request to a network for routing a call, in accordance with still yet another embodiment. As an option, the system 500 may be implemented in the context of the details of FIGS. 2-4. Of course, however, the system 500 may be implemented in any desired environment. Further, the aforementioned definitions may equally apply to the description below.

As shown, a first party 502 is in communication with an application server 506, in one embodiment, the application server 506 may include a session initiation protocol (SIP) server. Such SIP server may include an application layer control protocol utilized for initiating, creating, modifying, updating, and/or terminating sessions with one or more parties. For example, the SIP protocol may be utilized for receiving a voice call [e.g. voice over interne protocol (IP), etc.], a video call, a message, etc. initiated by the first party 502, application server 506, etc.

In addition, the first party 502 may be in communication with the application server 506 via, a network. In various embodiments, the network may include an IP multimedia system (IMS) network, a telecommunications network, etc., but of course may also include any of the networks described above with respect to FIG. 2. In this way, a call may be initiated from the first party 502 to a second party 510 via the application server 506, utilizing the network.

Thus, the first party 502 may communicate a request to the application server 506 for initiating a call between the first party 502 and the second party 510. In one embodiment, the first party 502 may communicate the request to the application server 506 utilizing a portal (not shown) in communication with the application server 506. The portal may be an application associated with the application server 506, such as a web portal, an application portal, etc.

As an option, the portal may be coupled to the application server 506, residing on the application server 506, executing on the application server 506, etc. For example, the portal may be in communication with the application server 506 via network messages, application messages, or any other protocol capable of allowing communication between the portal and the application server 506. Furthermore, in yet another embodiment, the portal may be a device associated with the application server 506. For example, the device may be a standalone device, an integrated device, or any other device capable of communicating with the application server 506.

Still yet, in another embodiment, the application server 506 initiates an originating call request on behalf of the first party 502. To this end, the application server 506 may initiate the originating call request in response to the request received from the first party 502. In another embodiment, the application server 506 may process the request received from the first party 502 in response to receipt thereof, prior to initiating the originating, call request.

In one embodiment, such processing may include setting up the call between the first party 502 and the second party 510. For example, the call may be set up by applying services (e.g. private extension dialing, distinctive ringing, etc.) to the call that may be utilized by the first party 502 and the second party 510 during the call. In another embodiment, the processing may include determining information identifying the first party 502 (e.g. utilizing a source address associated with the initiated call) and/or the second party 510 to which the call was initiated (e.g. utilizing a called destination address associated with the initiated call). As an option, such determination may be made based on information included in the request received by the first user 502. Of course, however, the determination may be made in any desired manner.

In yet another embodiment, the processing may include utilizing the first party identification information and the second party identification information to determine if the first party 502 and the second party 510 are members of a group. Thus, the application server 506 may analyze the identity of the first party 502 and identity the second party 510 for determining whether such parties are members of the group. In another embodiment, the application server 506 may query a database of configuration information for determining whether the first party 502 and the second party 510 are members of the group. For example, such configuration information may indicate groups associated with various parties. Thus, as an option, identifiers of the first party 502 and the second party 510 may be utilized for querying the database for groups associated therewith.

In one embodiment, the database of configuration information may be included in (e.g. local too) the application server 506. In another optional embodiment, the database of configuration information may be remotely located with respect to the application server 506. For example, the database of configuration information may be stored on another server in communication with the application server 506 via the network.

Table 1 illustrates one example of a database of configuration information. It should be noted that such database is set forth for illustrative purposes only, and thus should not be construed as limiting in any manner.

TABLE 1

| PARTY | GROUP IDENTIFIER |
|---|---|
| PARTY_01 | GROUP_01 |
| PARTY_02 | GROUP_02 |
| PARTY_03 | GROUP_01 |

Still yet, in one embodiment, if it is determined that the first party 502 and second party 510 are members of the group, the application server 506 may perform originating call processing and terminating call processing. For example, such originating call processing and terminating call processing may include applying group services to the call for use by the first party 502 and the second party 510. In another embodiment, if it is determined that the first party 502 and second party 510 are not members of the group, the application server 506 may only perform originating processing. In this way, group services may only be applied to the call for the first party 502.

Further, the application server 506 may route the originating call request to the originating server 504 (e.g. via the network). Such originating call request may include information indicating that the originating processing and/or the terminating processing, have already been performed. In one embodiment, if it is determined that the first party 502 and second party 510 are members of the group, the indicating information may indicate that the originating processing and the terminating processing have been performed. Still yet, in another embodiment, if it is determined, that the first party 502 and second party 510 are not members of the group, the indicating information may only indicate that the originating processing has been performed.

To this end, the indicating information may be associated with the originating call request, wrapped around the originating call request, included within the originating call request, etc. Further, the indicating information may be included in a header of the originating call request, a body of the originating call request, or any other portion of the originating call request. Optionally, the header of the originating call request may include a plurality of values, may be configurable, etc. In one embodiment, the header may include a globally unique signaling identifier.

In another embodiment, the globally unique signaling identifier may be based on information associated with the call, a random sequence, a media access control (MAC) address, a message-digest algorithm 5 (MDS) hash, a secure hash algorithm (SI-IA) bash, etc. For example, the globally unique signaling identifier may include a unique identifier included in the originating call request, such as, for example, a SIP header of such call request. As another example, the unique identifier may include an IMS charging identity (ICID) from a p-charging vector header. In one embodiment, the charging vector may be a collection of charging information related to the call.

In one embodiment, the originating server 504 to which the originating call request is routed may include a session initiation protocol (SIP) server. Additionally, the SIP server may include a call session control function (CSCF) server, which may be utilized in processing SIP packets in the NS network. Optionally, the CSCF server may further include a proxy-call session control function (P-CSCF) server, a serving-call session control function (S-CSCF) server, an interrogating-call session control function (I-CSCF) server, etc. Further, the SIP server may handle SIP registrations, inspect SIP messages, decide to which application server the SIP message will be forwarded, provide routing services, enforce network policies, provide load balancing with other SIP servers, etc.

In one embodiment, the originating server 504 may register the first party 502 by associating a source address of the first party 502 with a SIP address. In another embodiment, the SIP address may be a uniform resource identifier (URI). For example, the URI may include a tel-uri (e.g. which may include digits), a sip-uri (e.g. which may include alphanumeric identifiers), etc. Table 2 illustrates two examples of URIs that may be associated with a source address of the first party 502. Of course, it should be noted that such URIs are set forth for illustrative purposes only, and thus should not be construed as limiting in any manner.

TABLE 2

| URI | EXAMPLE |
|---|---|
| tel-uri | tel:+1-555-987-6543 |
| sip-uri | sip:joe.user@domain.com |

In response to receipt of the originating call request from the application server 506, the originating server 504 may receive data associated with the first party 502 from a database 512. In one embodiment, the database 512 may include a home subscriber server (HSS) database. Additionally, in another embodiment, such data may include any information capable of being associated with the first party 502. For example, the data may include profile information (e.g. location, etc.) associated with the first party 502.

Further, the originating server 504 may determine whether to communicate the originating call request to the application server 506 based on the indicating information in the received originating call request. For example, the indicating information may prevent the originating server 504 from routing the originating call request to the application server 506 for performing originating processing thereon, if the originating call request indicates that the originating processing has already been performed.

In addition, the originating server 504 may forward the originating call request to a terminating server 508 (e.g. via the network). Optionally, the terminating server 508 may include a S-CSCF server, etc. Further, the terminating server 508 may be associated with the second party 510.

In one embodiment, the originating server 504 may reside on a home network, and the terminating server 508 may reside on a foreign network. For example, the home network may be the network of the first party 502, and the foreign network may be the network of the second party 510 that is different than the borne network. In yet another embodiment, the originating server 504 and the terminating server 508 may reside on the same network. Still yet, in another embodiment, the application server 506 may reside on the home network, but of course may also reside on the foreign network and/or any other network in communication with the network(s) of the originating server 504 and the terminating server 508.

In response to receiving the originating call request, the terminating server 508 may receive data associated with the second party 510 from the database 512. Still yet, the terminating server 508 may determine whether to communicate a terminating call request associated with the receipt of the originating call request to the application server 506 based on the indicating, information in the received originating call request. For example, the indicating information may prevent the terminating server 508 from routing the terminating, call request to the application server 506 for performing terminating processing thereon, if the originating call request indicates that the terminating processing has already been performed. Furthermore, the terminating server 508 may forward the terminating call request to the second party 510 (e.g. via the network) if the terminating server 508 determines that the originating call request indicates that the terminating processing has already been performed.

Still yet, in another embodiment, the terminating server 508 may forward the terminating call request to the application server 506 for terminating processing if the terminating server 508 determines that the originating call request indicates that the terminating processing has not been performed (not shown). In this way, the application server 506 may perform the terminating processing for the second party 510 (e.g. by identifying group services associated with the second party 510, applying such identified group services to the call, etc.). In addition, after the terminating processing has been performed by the application server 506, the application server 506 routes the terminating call request to the terminating server 508, such that the terminating server 508 may further forward such terminating call request to the second party 510.

Figure 6:
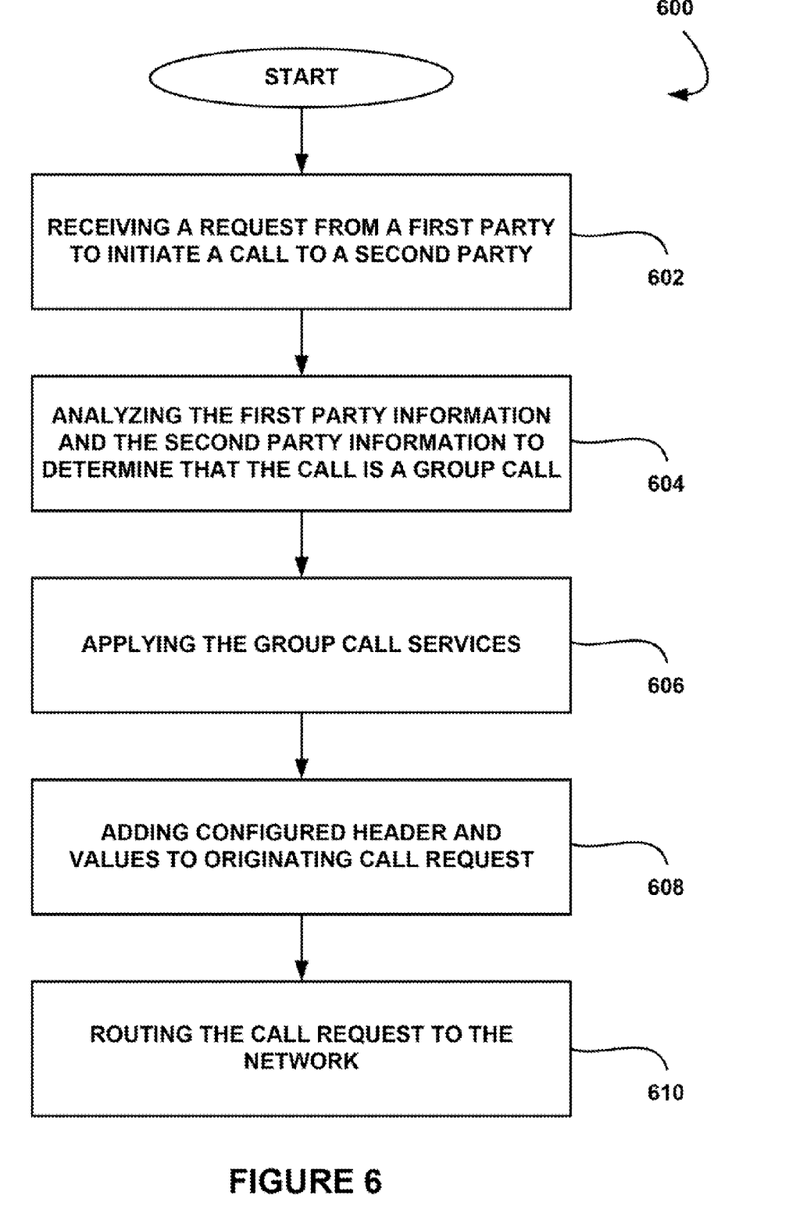
FIG. 6 illustrates a method for sending a request to a network for routing a group call, in accordance with another embodiment.

FIG. 6 illustrates a method 600 for sending a request to a network for routing a group call, in accordance with another embodiment. As an option, the method 600 may be carried out in the context of the details of FIGS. 2-5. Of course, however, the method 600 may be carried out in any desired environment. Further, the aforementioned definitions may equally apply to the description below.

As shown, a request is received from a first party to initiate a call to a second party. See operation 602. As an option, an application server may initiate the call in response to the received request. For example, the application server may determine information associated with the first party and the second party (e.g. source information of the first party, destination information of a second party to which the call is to be received, etc.). As an option, such information may identify the first party and the second party (e.g. the locations thereof, etc.).

Additionally, the first party information and second party information are analyzed to determine if such parties are members of a group. See operation 604. For example, the first party information may indicate the identity of the first party, whereas the second party information may indicate an identity of the second party. In one embodiment, the first party information and the second party information may be obtained from the originating call request. Further, in another embodiment, the first party information and the second party information may be obtained from a database.

If it is determined that the first party and second party are members of the group, group call services are applied to the call for use by the first party and the second party. See operation 606. Such group call services may be based on the group associated with the first party and the second party. Of course, as another option, additional services may also be applied to the call, which are not necessarily included in the group services, as desired.

Further, a configured header and values are added to an originating call request. See operation 608. For example, an application server may create, update, append, etc. values to the configured header indicating that originating and terminating processing have been performed for the originating call request. Further, the originating call request is routed to the network. See operation 610. In this way, the originating call request may be communicated over the network to the second party to which the call was initiated.

Figure 7:
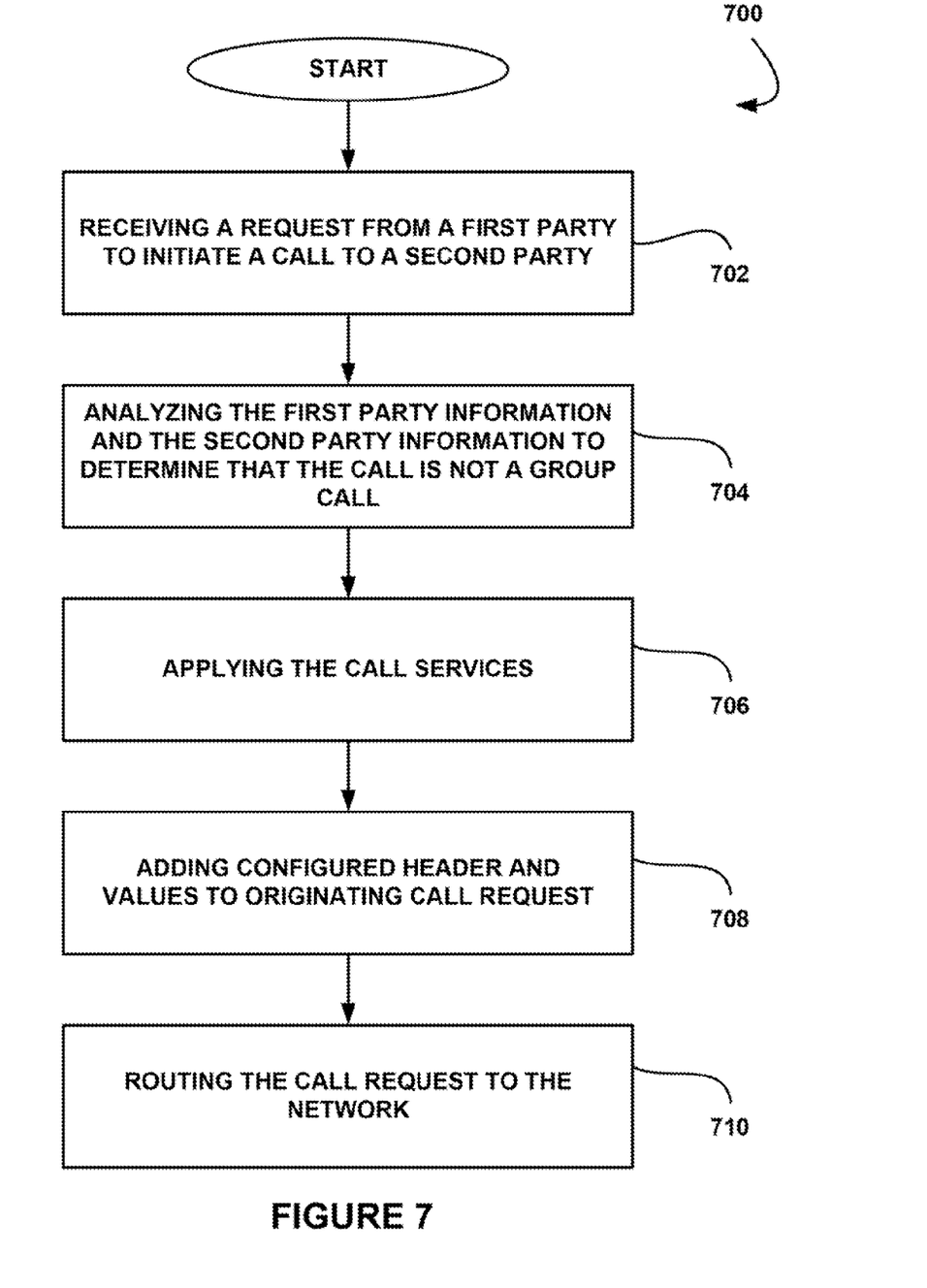
FIG. 7 illustrates a method for sending a request to a network for routing a non-group call, in accordance with yet another embodiment.

FIG. 7 illustrates a method 700 for sending a request to a network for routing a non-group call, in accordance with yet another embodiment. As an option, the method 700 may be carried out in the context of the details of FIGS. 2-5. Of course, however, the method 700 may be carried out in any desired environment. Further, the aforementioned definitions may equally apply to the description below.

As shown, a request is received from a first party to initiate a call to a second party. See operation 702. As an option, an application server may initiate the call in response to the received request. For example, the application server may determine information associated with the first party and the second party (e.g. source information of the first party, destination information of a second party to which the call is to be received, etc.). As an option, such information may identify the first party and the second party (e.g. the locations thereof, etc.).

Additionally, the first party information and second party information are analyzed to determine if such parties are members of a group. See operation 704. For example, the first party information may indicate the identity of the first party, whereas the second party information may indicate an identity of the second party. In one embodiment, the first party information and the second party information may be obtained from the originating call request. Further, in another embodiment, the first party information and the second party information may be obtained from a database.

If the application server determines that the first party and second party are not members of the group, the application server applies originating call services to the call for the first party. See operation 706. Such originating call services may be based on the group associated with the first party, as an option. Of course, as another option, additional services may also be applied to the call, which are not necessarily included in the group services, as desired.

Further, the application server adds a configured header and values to an originating call request. See operation 708. For example, the application server may create, update, append, etc. values to the configured header indicating that originating processing has been performed for the originating call request. Further, the originating call request is routed to the network. See operation 710. In this way, a terminating call request may be communicated over the network to a terminating server associated with the second party. Thus, in response to a determination that terminating call processing has not been performed, based on the configured header of the originating call request, the terminating server may forward such terminating call request to the application server for performing the terminating call processing. Moreover, the terminating call request may be forwarded to the second user after such terminating call processing is performed.

The following example illustrating the aforementioned embodiments is set forth for illustrative purposes only, and thus should not be construed as limiting in any manner. In use, a first party initiates a call request to a second party via a web portal. The web portal forwards the request to an application server via as network. Further, the application server receives the request and initiates an originating call request on behalf of the first party.

In addition, the application server processes the request and analyzes the first party identity and the second party destination address to determine if the first party and the second party are members of the same group. If it is determined that the first party and the second party are members of the same group, the application server provides both originating processing and terminating processing with respect to the initiated call for the first party and the second party. For example, the application server may apply services to the call for the first party and the second party. Additionally, the application server updates a header of the originating call request to indicate that the originating, processing and the terminating processing have been performed.

If, however, is determined that the first party and the second party are not members of the same group, the application server provides originating processing with respect to the initiated call for the first party. For example, the application server may apply services to the call for the first party. In addition, the application server updates a header of the originating call request to indicate that only the originating processing has been performed.

Next, the application server forwards the originating call request to an originating server via the network. The originating server processes the originating call request and utilizes the information in the call request header to determine if the application server performed the originating processing on the call request. If it is determined that the originating processing has been performed on the originating call request, the originating server bypasses communication of the originating call request to the application server for such originating processing and forwards the originating call request to the terminating server on the home network of the second party.

Thus, the terminating server receives the originating call request from the originating server. Additionally, the terminating server processes the originating call request and utilizes the information in the originating call request header to determine if the application server performed the terminating processing on the originating call request. If it is determined that the terminating processing has been performed on the originating call request, the terminating server bypasses communication of a terminating call request to the application server for termination processing and forwards the terminating call request to the second party.

If, however, it is determined that the terminating processing was not performed, the terminating server routes a terminating call request to the application server for processing thereof. For example, the application server may apply services to the call for the second party. Furthermore, in response to such terminating processing, the application server forwards the processed terminating call request to the terminating server, which in turn forwards the terminating call request to the second party. In this way, a call between the first party and the second party may be initiated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method, comprising:
   initiating a call from a first party to a second party;
   determining whether the first party and the second party are members of a group; and
   sending a request to a network for routing the call, the request including an indication that at least one of origination processing and termination processing has already been performed, based on the determination;
   wherein the origination processing includes processing associated with the initiation of the call with respect to the first party, the processing associated with the initiation of the call with respect to the first party including the determining whether the first party and the second party are members of the group and applying services to the call for the first party;
   wherein the termination processing includes processing associated with processing the call for the second party, the processing the call for the second party including applying the services to the call for the second party.

2. The method of claim 1, wherein one or more of the initiating, determining, and sending is performed by an application server.

3. The method of claim 2, wherein the application server includes a session initiation protocol (SIP) application server.

4. The method of claim 1, wherein the group includes a closed user group.

5. The method of claim 4, wherein parties of the closed user group are provided with predetermined services.

6. The method of claim 1, wherein different sets of services are provided to different groups.

7. The method of claim 6, wherein the services include one or more of click-to-call, click-to-conference, blind transfer, find me forwarding, private extension dialing, distinctive ringing, an intercom feature, and enhanced telephony features.

8. The method of claim 1, wherein the call is initiated over a network.

9. The method of claim 1, wherein the request includes an indication that the origination processing has already been performed.

10. The method of claim 9, wherein the indication prevents an originating server from routing the request to an application server for performing the originating processing.

11. The method of claim 1, wherein the request includes an indication that the termination processing has already been performed.

12. The method of claim 11, wherein the indication prevents a terminating server from routing the request to an application server for performing the terminating processing.

13. The method of claim 1, wherein, if it is determined that the first party and the second party are not members of the group, the request is sent to the network for routing the call including only an indication that the origination processing has already been performed.

14. The method of claim 1, wherein, if it is determined that the first party and the second party are members of the group, the request sent to the network for routing the call includes an indication that the origination processing and the termination processing have already been performed.

15. The method of claim 1, wherein the request includes a header.

16. The method of claim 14, wherein the header is configurable.

17. The method of claim 14, wherein the header includes a globally unique signaling identifier.

18. The method of claim 14, wherein the header includes a plurality of values.

19. A computer program product embodied on a non-transitory computer readable medium, comprising:
   computer code for initiating a call from a first party to a second party;
   computer code for determining whether the first party and the second party are members of a group; and
   computer code for sending a request to a network for routing the call, the request including an indication that at least one of origination processing and termination processing has already been performed, based on the determination wherein the origination processing includes processing associated with the initiation of the call with respect to the first party, the processing associated with the initiation of the call with respect to the first party including the determining whether the first party and the second party are members of the group and applying services to the call for the first party;
   wherein the termination processing includes processing associated with processing the call for the second party, the processing the call for the second party including applying the services to the call for the second party.

20. A system, comprising:
   a device for initiating a call from a first party to a second party; and
   an application server in communication with the device, the application server for determining whether the first party and the second party are members of a group, and for sending a request to a network for routing the call, the request including an indication that at least one of origination processing and termination processing has already been performed, based on the determination;
   wherein the origination processing includes processing associated with the initiation of the call with respect to the first party, the processing associated with the initiation of the call with respect to the first party including the determining whether the first party and the second party are members of the group and applying services to the call for the first party;

wherein the termination processing includes processing associated with processing the call for the second party, the processing the call for the second party including applying the services to the call for the second party.

* * * * *